(12) United States Patent
Takahashi (10) Patent No.: US 10,061,296 B2
(45) Date of Patent: Aug. 28, 2018

(54) SAFETY SWITCH DEVICE, OPERATION TERMINAL, AND MACHINE CONTROL SYSTEM

(71) Applicant: FANUC CORPORATION, Minamitsuru-gun, Yamanashi (JP)

(72) Inventor: Shougo Takahashi, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 15/809,207

(22) Filed: Nov. 10, 2017

(65) Prior Publication Data

US 2018/0136631 A1 May 17, 2018

(30) Foreign Application Priority Data

Nov. 16, 2016 (JP) ................. 2016-223515

(51) Int. Cl.
*B25J 9/16* (2006.01)
*G05B 19/409* (2006.01)
(Continued)

(52) U.S. Cl.
CPC ............ *G05B 19/409* (2013.01); *B25J 9/101* (2013.01); *B25J 9/163* (2013.01); *B25J 9/1605* (2013.01);
(Continued)

(58) Field of Classification Search
CPC .......... A61B 2017/00199; B25J 9/1674; B25J 13/006; B25J 9/10
(Continued)

(56) References Cited

U.S. PATENT DOCUMENTS 4,697,979 A * 10/1987 Nakashima .............. B25J 19/06
180/2.1
5,369,346 A * 11/1994 Takahashi ............ B62D 57/032
180/8.1
(Continued)

FOREIGN PATENT DOCUMENTS

JP 2004148488 A 5/2004
JP 2015232804 A 12/2015
(Continued)

*Primary Examiner* — Bentsu Ro
*Assistant Examiner* — Thai Dinh
(74) *Attorney, Agent, or Firm* — RatnerPrestia (57) ABSTRACT

A machine control system includes an operation terminal which includes a communication unit and a touch panel unit and outputs machine operation information for operating a machine via the communication unit, a controller which controls the operation of the machine based on the received machine operation information, and a safety switch device which is mounted on the operation terminal and includes a switch unit which outputs a stop instruction signal for issuing an instruction to stop the machine, and a packet generation unit which converts the output stop instruction signal into a packet and outputs the packet to the operation terminal, wherein the operation terminal transfers the packet received from the safety switch device to the controller, and the controller restores a stop instruction signal from the packet received from the operation terminal and stops the machine based on the restored stop instruction signal.

15 Claims, 7 Drawing Sheets

(51) Int. Cl.
   *B25J 13/00*   (2006.01)
   *B25J 13/02*   (2006.01)
   *B25J 9/10*    (2006.01)

(52) U.S. Cl.
   CPC ............ *B25J 13/006* (2013.01); *B25J 13/02* (2013.01); *G05B 2219/33192* (2013.01); *G05B 2219/36159* (2013.01)

(58) Field of Classification Search
   USPC ... 318/568.1, 568.11, 568.16, 568.2, 568.25, 318/671, 672
   See application file for complete search history.

(56) References Cited

U.S. PATENT DOCUMENTS

| | | | | |
|---|---|---|---|---|
| 5,705,906 | A | * | 1/1998 | Tanabe ................... B25J 9/1671 318/567 |
| 5,783,922 | A | * | 7/1998 | Hashimoto ............. B25J 13/02 318/568.11 |
| 7,221,119 | B2 | * | 5/2007 | Hashimoto ............. B25J 19/06 318/467 |

FOREIGN PATENT DOCUMENTS

| | | |
|---|---|---|
| JP | 2016-060018 A | 4/2016 |
| JP | 2016060018 A | 4/2016 |

\* cited by examiner

SAFETY SWITCH DEVICE, OPERATION TERMINAL, AND MACHINE CONTROL SYSTEM

CROSS-REFERENCE TO RELATED APPLICATIONS

This application is a new U.S. Patent Application that claims benefit of JP 2016-223515, filed Nov. 16, 2016, the disclosure of this application is being incorporated herein by reference in its entirety for all purposes.

BACKGROUND OF THE INVENTION

1. Field of the Invention

The present invention relates to a safety switch device, an operation terminal, and a machine control system including the same for stopping a machine operating based on machine operation information received from the operation terminal.

2. Description of the Related Art

A portable wireless teaching pendant connected to a controller for a machine via wireless communication is used to operate, e.g., a robot or a CNC machine tool (to be also simply referred to as a "machine" hereinafter). In such a machine system, an emergency stop button or an enable switch (deadman switch) is provided on a wireless teaching pendant to avoid any unexpected operation of a robot or a machine tool to ensure the safety of surrounding machines or operators.

Figure 7:
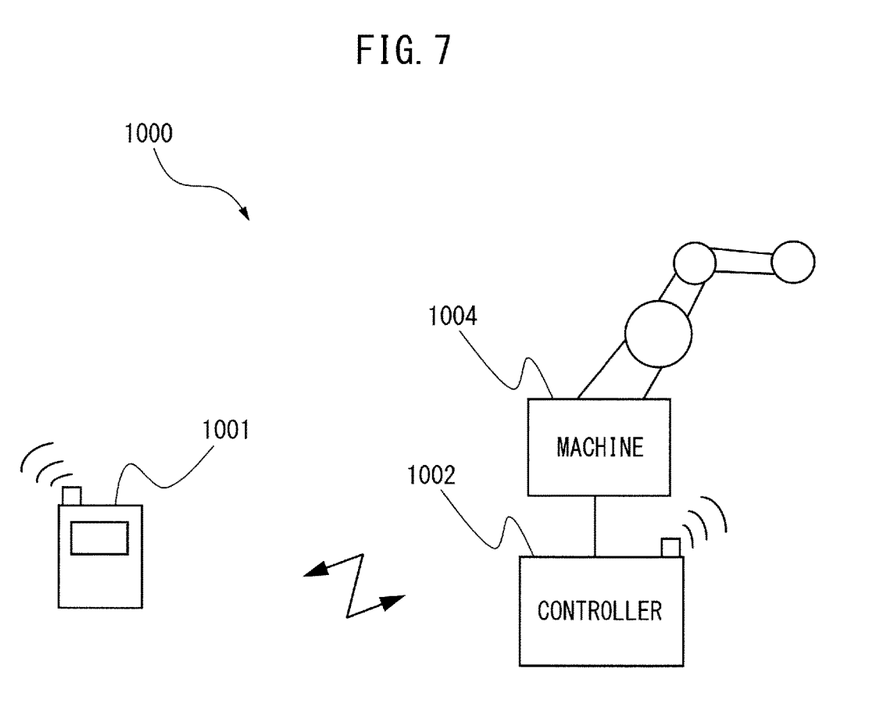
FIG. 7 is a schematic block diagram illustrating a general machine control system including a wireless teaching pendant and a controller for a machine.

FIG. 7 is a schematic block diagram illustrating a general machine control system including a wireless teaching pendant and a controller for a machine. In a general machine control system 1000, a portable wireless teaching pendant 1001 and a controller 1002 which controls a machine 1004 such as a robot or a CNC machine tool are connected to each other via wireless communication. The operator can perform, e.g., registration, editing, condition setting, or status display of an operation program associated with the machine 1004 or teaching of the machine 1004, using the wireless teaching pendant 1001. In such a machine control system 1000, to ensure the safety of the operator, the international standard stipulates that the wireless teaching pendant 1001 may have to include a mechanical safety switch unit such as an emergency stop button and an enable switch (deadman switch). When, for example, an emergency stop button (not illustrated) provided on the wireless teaching pendant 1001 is pressed by the operator, an emergency stop signal for bringing the machine 1004 to an emergency stop is transmitted from the wireless teaching pendant 1001 to the controller 1002 with a certain period, and, upon receiving the emergency stop signal, the controller 1002 can bring the machine 1004 to an emergency stop to ensure the safety of the machine 1004 or their surrounding machines and operators.

In recent years, for, e.g., cost reduction, versatility ensuring, and an improvement in operator convenience, a machine control system which operates a machine such as a robot or a CNC machine tool using a portable operation terminal (smart device) such as a tablet or a smartphone instead of a dedicated teaching pendant is employed. In such an operation terminal, while the arrangement of operation buttons displayed on a display can be advantageously changed to suit the operator's preferences, a mechanical safety switch unit such as an emergency stop button and an enable switch may be preferably provided, as in the case of a dedicated teaching pendant, to use the operation terminal as a teaching pendant.

In a robot operation device which operates a robot using a portable smart device such as a tablet or a smartphone including a touch panel unit used for display and input, a smart device equipped with a removable enable switch and emergency stop button is known, as disclosed in, e.g., Japanese Unexamined Patent Publication (Kokai) No. 2016-60018.

As described above, even in a machine control system which operates a machine such as a robot or a CNC machine tool using a portable operation terminal (smart device) such as a tablet or a smartphone, a mechanical safety switch unit such as an emergency stop button and an enable switch may be preferably provided on the operation terminal, as in the case of a dedicated teaching pendant.

Wired and wireless communication paths are available as communication paths for transmitting to a controller for a machine, a stop instruction signal for stopping the machine output from a mechanical safety switch unit provided on an operation terminal. Unfortunately, the use of a wired communication path to connect the safety switch unit and the controller for the machine to each other degrades the portability of the operation terminal equipped with the safety switch unit. However, the use of a wireless communication path to connect the safety switch unit and the controller for the machine to each other is inefficient because two types of wireless communication may be preferably handled: one for machine operation information for operating the machine and the other for a stop instruction signal, leading to a higher cost. In addition, mutual interference may occur between two types of wireless communication paths between the safety switch unit and the controller for the machine.

SUMMARY OF INVENTION

There is a demand for a safety switch device, an operation terminal, and a machine control system including the same which can reliably stop a machine operating based on machine operation information in an emergency and achieve high convenience and versatility and low cost.

In one aspect of the present disclosure, a machine control system includes a portable operation terminal including a communication unit which communicates with a peripheral device and a touch panel unit used for display and input, the operation terminal outputting machine operation information for operating a machine via the communication unit based on an input operation to the touch panel unit, a controller which controls operation of the machine based on the machine operation information received from the operation terminal, and a safety switch device which is removably mounted on the operation terminal and includes a switch unit which outputs a stop instruction signal for issuing an instruction to stop the machine by being operated, and a packet generation unit which converts the stop instruction signal output by operating the switch unit into a packet and outputs the packet to the communication unit of the operation terminal, wherein the operation terminal transfers the packet received from the safety switch device to the controller via the communication unit, and the controller restores a stop instruction signal from the packet received from the operation terminal and stops the machine based on the restored stop instruction signal.

Herein, the packet generation unit in the safety switch device may convert the stop instruction signal into a multiplexed packet.

Further, the communication unit of the operation terminal may transmit the packet to the controller via a communication channel common to the machine operation information.

Further, the communication unit of the operation terminal may receive the packet from the safety switch device via a communication channel different from the communication channel used to transmit the machine operation information and the packet to the controller.

Further, the switch unit may include at least one of an emergency stop button which outputs the stop instruction signal by being pressed, and an enable switch which outputs the stop instruction signal by cancelling pressing.

In another aspect of the present disclosure, a safety switch device for stopping a machine operating based on machine operation information received from a portable operation terminal including a communication unit which communicates with a peripheral device and a touch panel unit used for display and input includes a mount unit configured to removably mount the safety switch device on the operation terminal, a switch unit which outputs a stop instruction signal for issuing an instruction to stop the machine by being operated, and a packet generation unit which converts the stop instruction signal output by operating the switch unit into a packet and outputs the packet to the communication unit of the operation terminal, wherein the machine is stopped by a controller which controls operation of the machine, based on a stop instruction signal restored from the packet transferred to the controller via the communication unit of the operation terminal.

Herein, the packet generation unit may convert the stop instruction signal into a multiplexed packet.

Further, the packet may be transmitted to the controller, together with the machine operation information, via a common communication channel by the communication unit of the operation terminal.

Further, the packet generation unit may transmit the packet to the operation terminal via a communication channel different from the communication channel used to transmit the machine operation information and the packet to the controller by the communication unit of the operation terminal.

Further, the switch unit may include at least one of an emergency stop button which outputs the stop instruction signal by being pressed, and an enable switch which outputs the stop instruction signal by cancelling pressing.

In still another aspect of the present disclosure, a portable operation terminal which transmits based on an input operation, machine operation information for operating a machine to a controller which controls operation of the machine includes a communication unit which communicates with a peripheral device including the controller, a touch panel unit used for display and input operations in an editing task for the machine operation information, and a housing on which a safety switch device including a switch unit which outputs a stop instruction signal for issuing an instruction to stop the machine by being operated, and a packet generation unit which converts the stop instruction signal output by operating the switch unit into a packet and outputs the packet to the communication unit of the operation terminal is removably mounted, wherein the communication unit transfers the packet received from the packet generation unit in the safety switch device to the controller, and the machine is stopped based on a stop instruction signal restored from the packet by the controller.

Herein, the stop instruction signal may be converted into a multiplexed packet by the packet generation unit.

Further, the communication unit may transmit the packet to the controller via a communication channel common to the machine operation information.

Further, the communication unit may receive the packet from the safety switch device via a communication channel different from the communication channel used to transmit the machine operation information and the packet to the controller.

Further, the switch unit may include at least one of an emergency stop button which outputs the stop instruction signal by being pressed, and an enable switch which outputs the stop instruction signal by cancelling pressing.

BRIEF DESCRIPTION OF THE DRAWINGS

The present invention will be more clearly understood with reference to the following accompanying drawings.

DETAILED DESCRIPTION

Next, embodiments of the present disclosure will be described with reference to the drawings. In the following drawings, similar members are provided with similar reference signs. To facilitate understanding, these figures have been suitably changed in scale. Further, embodiments as illustrated in the figures are one example so as to carry out one aspect of the present disclosure and such embodiments are not limitative.

Figure 1:
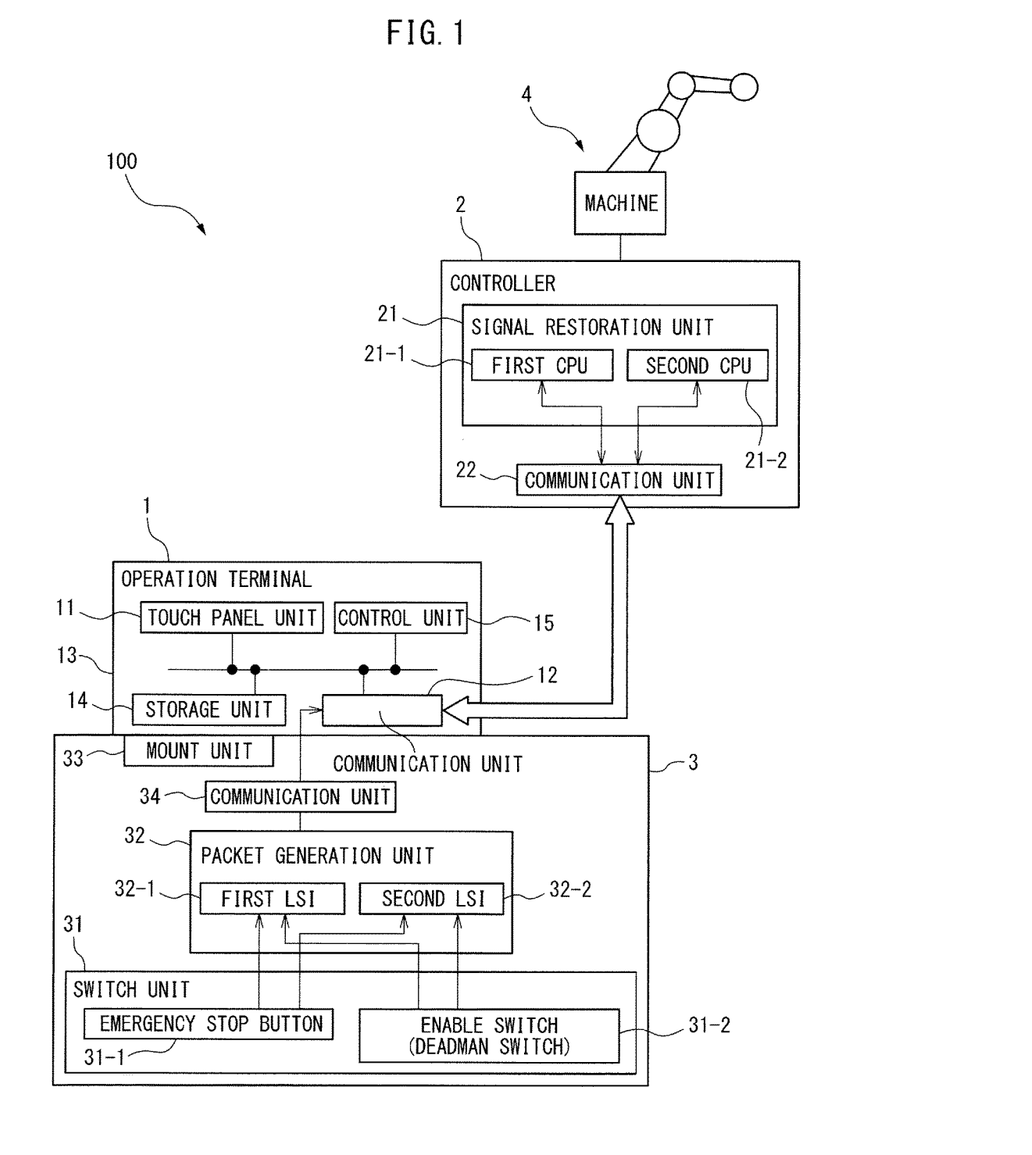
FIG. 1 is a block diagram illustrating a machine control system according to an embodiment of the present disclosure.

FIG. 1 is a block diagram illustrating a machine control system according to an embodiment of the present disclosure. The same reference numerals in different drawings denote components having the same functions hereinafter. In this embodiment, a machine 4 is operated on a portable operation terminal 1 and implemented as, e.g., a robot or a CNC machine tool.

A machine control system 100 according to this embodiment includes a portable operation terminal 1, a controller 2 which controls the operation of the machine 4, and a safety switch device 3 removably mounted on the operation terminal 1.

The operation terminal 1 is implemented as a smart device such as a tablet or a smartphone. The operation terminal 1 may even be implemented as a notebook computer. In this embodiment, the operation terminal 1 transmits based on an input operation, machine operation information for operating the machine 4 to the controller 2 that controls the operation of the machine 4. More specifically, the operation terminal 1 includes a communication unit 12 which communicates with a peripheral device including the controller 2, a touch panel unit 11 used for display and input operations in an editing task for the machine operation information, and a housing 13 on which the safety switch device 3 is removably mounted.

In the operation terminal 1, the communication unit 12, the touch panel unit 11, and a storage unit 14 are electrically connected to each other via a control unit 15 and buses, and the operation of the operation terminal 1 including the communication unit 12 and the touch panel unit 11 is controlled by the control unit 15. A teaching software program implemented as an application program for operating the machine 4 is installed on the storage unit 14, and the control unit 15 controls the operation of the operation terminal 1 in accordance with the teaching software program. Hence, the operation terminal 1 functions as a wireless teaching pendant which operates (teaches) the machine 4. The operator can perform editing and confirmation tasks such as registration or condition setting of operations associated with the machine 4, through the input and display functions of the touch panel unit 11 of the operation terminal 1.

The communication unit 12 of the operation terminal 1 is used for communication with a peripheral device. The peripheral device includes the controller 2 that controls the machine 4. The communication unit 12 of the operation terminal 1 and a communication unit 22 of the controller 2 that controls the machine 4 are connected to each other via wireless communication. Examples of such wireless communication include wireless LANs such as Wi-Fi, Bluetooth®, and infrared communication. Instead of wireless communication, wired communication may be used, but in this case, the portability of the operation terminal 1 is relatively low although the stability of communication between the operation terminal 1 and the controller 2 is relatively high. The communication unit 12 transfers a packet received from a packet generation unit 32 in the safety switch device 3 to the controller 2 and transmits machine operation information for defining teaching details input on the operation terminal 1 to the controller 2, although details will be described later.

The safety switch device 3 is removably mounted on the housing 13 of the operation terminal 1.

The safety switch device 3 is used to stop the machine 4 in an emergency. The safety switch device 3 includes mount units 33 for removably mounting the safety switch device 3 on the operation terminal 1, a switch unit 31 which outputs a stop instruction signal for issuing an instruction to stop the machine 4 by being operated, and a packet generation unit 32 which converts the stop instruction signal output by operating the switch unit 31 into a packet and outputs the packet to the communication unit 12 of the operation terminal 1. The power involved in operating the safety switch device 3 may be supplied via a cable (a USB cable or a dedicated power supply cable) from the operation terminal 1 on which the safety switch device 3 is mounted, or supplied from a battery built into the safety switch device 3.

The safety switch device 3 further includes a communication unit 34 as a means for transmitting the packet generated by the packet generation unit 32 to the communication unit 12 of the operation terminal 1. The communication unit 34 of the safety switch device 3 and the communication unit 12 of the operation terminal 1 may be connected to each other via either wireless or wired communication. Examples of such wireless communication include wireless LANs such as Wi-Fi, Bluetooth®, and infrared communication. Examples of such wired communication include communication via a USB cable.

The switch unit 31 of the safety switch device 3 includes at least one of a mechanical emergency stop button 31-1 which outputs a stop instruction signal by being pressed, and a mechanical enable switch (deadman switch) 31-2 which outputs a stop instruction signal by cancelling pressing. In an exemplary example illustrated as FIG. 1, one emergency stop button 31-1 and one enable switch 31-2 are provided as the switch unit 31, but only one of an emergency stop button 31-1 and an enable switch 31-2 may be provided, or a plurality of emergency stop buttons 31-1 and/or a plurality of enable switches 31-2 may be provided. When the operator wants to bring the machine 4 to an emergency stop upon, e.g., the occurrence of an abnormality in the machine 4, he or she presses the emergency stop button 31-1 to output a stop instruction signal from the emergency stop button 31-1. In the normal operation of the machine 4, the operator uses the operation terminal 1 while gripping the enable switch 31-2 of the safety switch device 3 with his or her hand (i.e., while the enable switch 31-2 is kept pressed), but when he or she releases his or her grip on the enable switch 31-2 for some reason, the pressing of the enable switch 31-2 is cancelled and a stop instruction signal is output from the enable switch 31-2.

Figure 2:
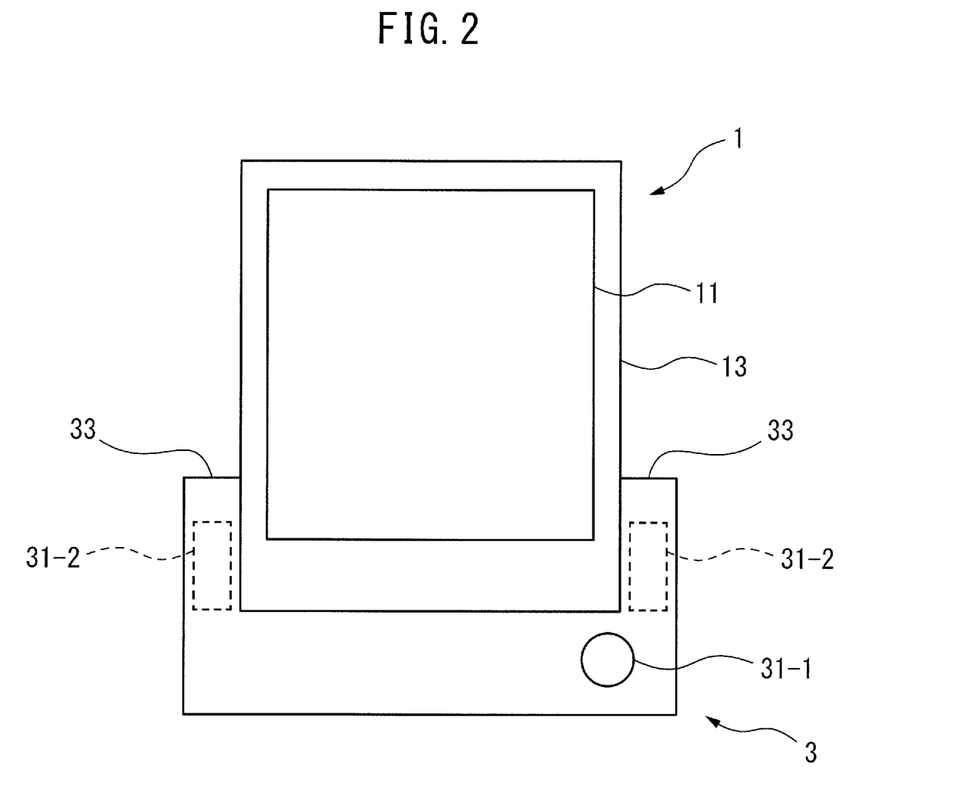
FIG. 2 is a front view illustrating a first example of fitting between a safety switch device and an operation terminal according to the embodiment of the present disclosure.
Figure 3:
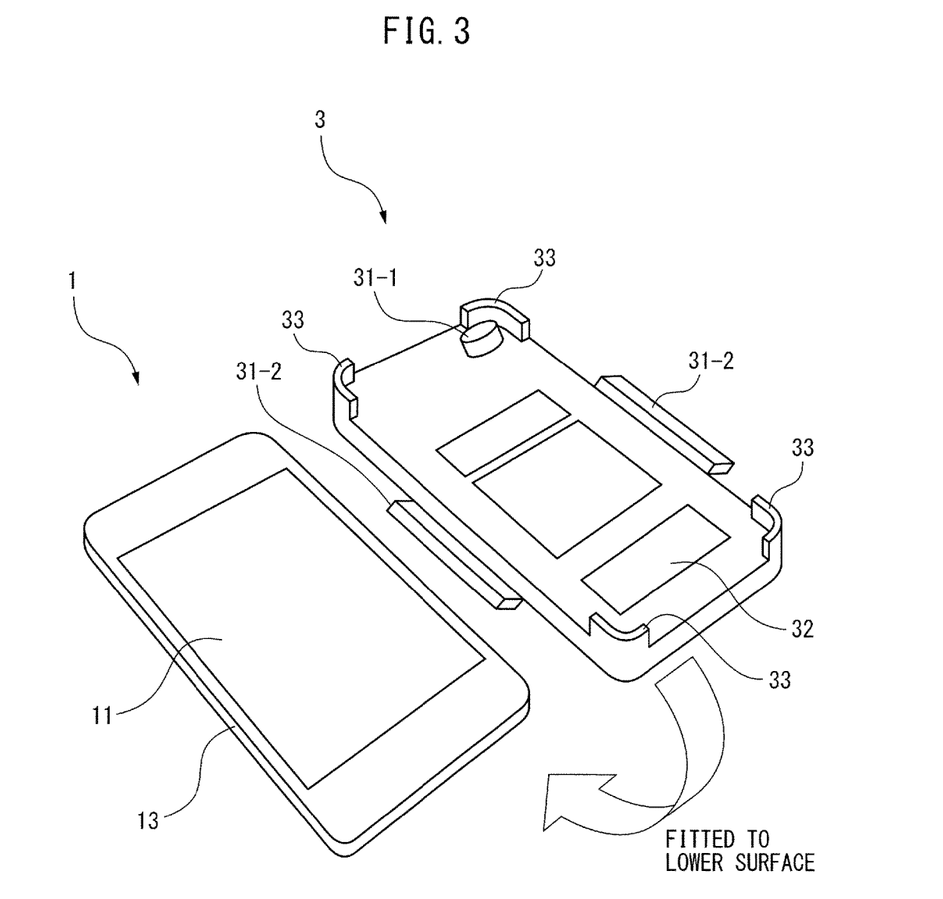
FIG. 3 is a perspective view illustrating a second example of fitting between a safety switch device and an operation terminal according to the embodiment of the present disclosure.

The mount units 33 of the safety switch device 3 are used to removably mount the safety switch device 3 on the housing 13 of the operation terminal 1. Although examples of fitting between the safety switch device 3 and the operation terminal 1 will be given below with reference to FIGS. 2 and 3, the safety switch device 3 may be mounted on the operation terminal 1 using a method other than those illustrated as FIGS. 2 and 3. FIG. 2 is a front view illustrating a first example of fitting between a safety switch device and an operation terminal according to the embodiment of the present disclosure. As the structure of the mount units 33 of the safety switch device 3, the safety switch device 3 is mounted on the operation terminal 1 to partially cover the housing 13 of the operation terminal 1. FIG. 3 is a perspective view illustrating a second example of fitting between a safety switch device and an operation terminal according to the embodiment of the present disclosure. The mount units 33 are placed at the four corners of the safety switch device 3, which is mounted on the operation terminal 1 to be fitted together from the lower surface of the operation terminal 1 through the mount units 33. In the examples illustrated as FIGS. 2 and 3, one emergency stop button 31-1 and two enable switches 31-2 are provided as the switch unit 31.

The packet generation unit 32 of the safety switch device 3 converts the stop instruction signal output by operating the switch unit 31 into a packet and outputs the packet to the communication unit 12 of the operation terminal 1. More specifically, the packet generation unit 32 generates a packet by dividing the stop instruction signal from the switch unit 31 and adding sequence numbers to the divided signals. In this embodiment, to improve the communication safety and reliability, the packet generation unit 32 multiplexes processing for generating a packet from the stop instruction signal. In other words, to generate different types of packets from one stop instruction signal, the packet generation unit 32 includes a plurality of LSIs as processors which generate packets from the stop instruction signal. In an exemplary example illustrated as FIG. 1, packet generation processing is dualized, so that the packet generation unit 32 includes a first LSI 32-1 and a second LSI 32-2. The stop instruction signal output by pressing the emergency stop button 31-1 is input to each of the first LSI 32-1 and the second LSI 32-2. Similarly, the stop instruction signal output by canceling the pressing of the enable switch 31-2 is input to each of the first LSI 32-1 and the second LSI 32-2. In each of the first LSI 32-1 and the second LSI 32-2, a packet is generated by dividing the received stop instruction signal and adding sequence numbers to the divided signals. The respective packets generated by the first LSI 32-1 and the second LSI 32-2 are transmitted to the communication unit 12 of the operation terminal 1 via the communication unit 34. As a modification to this embodiment, in either the first LSI 32-1 or the second LSI 32-2, a packet generated by this LSI may be concatenated with a packet generated by the other LSI and then the obtained packet may be transmitted to the communication unit 12 of the operation terminal 1 via the communication unit 34.

The packet generation unit 32 may be configured to generate a packet appended with an error detection signal or an error correction signal to further improve the communication safety and reliability. Examples of the error detection signal and the error correction signal include a cyclic redundancy check (CRC).

The safety switch device 3 may include components other than the switch unit 31, the packet generation unit 32, the mount units 33, and the communication unit 34. The safety switch device 3 may include, e.g., a unit which generates an electrical signal other than a stop instruction signal, and in this case, the packet generation unit 32 may generate a packet containing the electrical signal.

The packet generated by the packet generation unit 32 in the above-mentioned manner is transmitted to the communication unit 12 of the operation terminal 1 via the communication unit 34. The communication unit 12 of the operation terminal 1 further transfers the packet received from the packet generation unit 32 to the controller 2. Transfer processing for receiving a packet from the communication unit 34 of the safety switch device 3 and transferring the packet to the communication unit 22 of the controller 2 by the communication unit 12 of the operation terminal 1 is performed as appropriate during intervals between processes based on the teaching software program of the operation terminal 1. A software program associated with a series of packet transfer processes (to be referred to as a "packet transfer software program" hereinafter) is also stored in the storage unit 14, and the control unit 15 performs packet transfer processing in accordance with the packet transfer software program. The communication unit 12 of the operation terminal 1 transmits machine operation information to the controller 2, and since a packet is transmitted from the operation terminal 1 to the controller 2 via a communication channel common to the machine operation information, the communication path for a packet associated with a stop instruction signal also serves as a black channel. As the communication channel for communication between the communication unit 34 of the safety switch device 3 and the communication unit 12 of the operation terminal 1, a communication channel different from that for communication between the communication unit 12 of the operation terminal 1 and the communication unit 22 of the controller 2 is used so as to prevent mutual communication interference. In other words, the communication unit 12 of the operation terminal 1 receives a packet from the safety switch device 3 via a communication channel different from that used to transmit the machine operation information and the packet to the controller 2. A specific example of the packet transfer processing will be described later.

The controller 2 controls the operation of the machine 4 based on the machine operation information received from the operation terminal 1. The machine operation information is received via the communication unit 22. The controller 2 restores a stop instruction signal from the packet received from the operation terminal 1 and stops the machine 4 based on the restored stop instruction signal. The controller 2 therefore includes a signal restoration unit 21 which restores a stop instruction signal from the packet received from the operation terminal 1. As described above, since the packet is multiplexed by the packet generation unit 32 of the safety switch device 3, the signal restoration unit 21 in the controller 2 restores one stop instruction signal from the multiplexed packet. The signal restoration unit 21 in the controller 2 therefore includes a plurality of CPUs as processors which restore one stop instruction signal from the multiplexed packet. In an exemplary example illustrated as FIG. 1, since packet generation processing is dualized, the signal restoration unit 21 includes a first CPU 21-1 and a second CPU 21-2. The packet received via the communication unit 22 is input to each of the first CPU 21-1 and the second CPU 21-2 on the basis of the sequence numbers. A stop instruction signal is restored in each of the first CPU 21-1 and the second CPU 21-2, and the restoration results are compared by the first CPU 21-1 and the second CPU 21-2. The controller 2 uses the stop instruction signals in processing for stopping the machine 4 as valid data only when they match each other, and outputs an alarm when they are mismatched. When one or both of the packets have an error, the controller 2 may perform retry processing within the time limit permitted by the system. In this manner, according to this embodiment, since packet generation processing associated with a stop instruction signal is dualized, the possibility that the controller 2 will receive an erroneous stop instruction signal can be reduced even when a bug occurs in the packet transfer software program within the operation terminal 1 or communication failure occurs in each communication path. When the packet received via the communication unit 22 is generated by concatenating the respective packets generated by the first LSI 32-1 and the second LSI 32-2 in the packet generation unit 32, this packet is divided by either the first CPU 21-1 or the second CPU 21-2, and a stop instruction signal is then restored in each of the first CPU 21-1 and the second CPU 21-2.

When the packet generation unit 32 is configured to generate a packet appended with an error detection signal or an error correction signal to further improve the communication safety and reliability, the controller 2 includes an error detection and correction unit (not illustrated) which detects the presence or absence of a packet error on the basis of an error detection signal added to a packet received from the operation terminal 1 or corrects a packet error on the basis of an error correction signal added to a packet received from the operation terminal 1.

Packet transfer processing in the operation terminal 1 will be described below with reference to FIGS. 4 to 6. For the sake of easy explanation, the communication units 12, 22, and 34 used for respective types of communication between the operation terminal 1 and the controller 2 and between the operation terminal 1 and the safety switch device 3 will not be particularly referred to herein, but it is to be noted that any of the communication units 12, 22, and 34 is engaged in each such type of communication. Since the processing of the first LSI 32-1 and the second LSI 32-2 in the packet generation unit 32 and the processing of the first CPU 21-1 and the second CPU 21-2 in the controller 2 are the same as above, a description thereof will not be given hereinafter.

Figure 4:
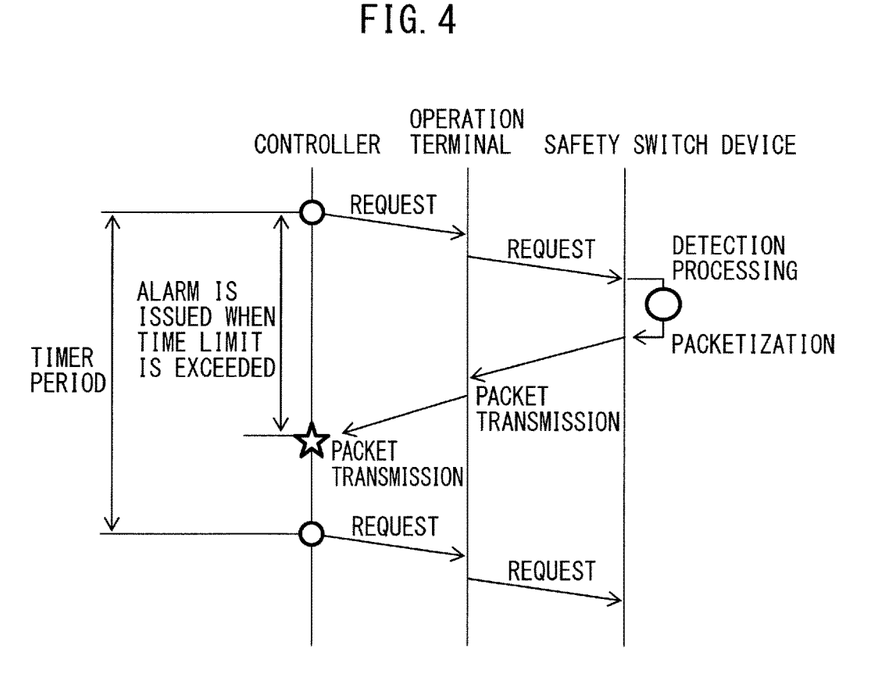
FIG. 4 is a diagram illustrating an exemplary communication diagram when a controller is equipped with a timer in the embodiment of the present disclosure.

FIG. 4 is a diagram illustrating an exemplary communication diagram when a controller is equipped with a timer in the embodiment of the present disclosure. In this case, the controller 2 transmits a request signal to the operation terminal 1 with a predetermined timer period. The operation terminal 1 transfers the received request signal to the safety switch device 3. In response to the request signal, the safety switch device 3 performs processing for detecting whether the switch unit 31 has been operated. When the switch unit 31 has been operated, since a stop instruction signal is output from the switch unit 31, the packet generation unit 32 in the safety switch device 3 converts the stop instruction signal into a packet and outputs the packet to the operation terminal 1, which further transfers the packet received from the safety switch device 3 to the controller 2. The controller 2 restores a stop instruction signal from the packet received from the operation terminal 1 and stops the machine 4 based on the restored stop instruction signal. It takes a certain time, after the controller 2 transmits a request signal to the operation terminal 1, until it receives a packet from the operation terminal 1, and when this time exceeds a preset time limit (set to a time shorter than the timer period) as well, the controller 2 stops the machine 4 for the sake of safety (alarm stop).

Figure 5:
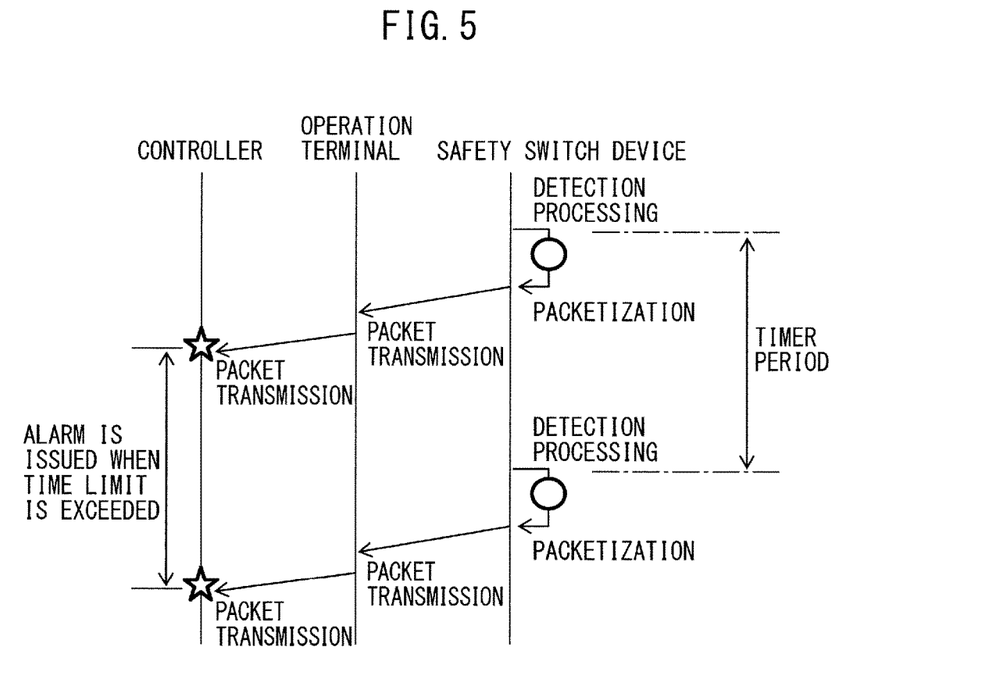
FIG. 5 is a diagram illustrating an exemplary communication diagram when the safety switch device is equipped with a timer in the embodiment of the present disclosure.

FIG. 5 is a diagram illustrating an exemplary communication diagram when the safety switch device is equipped with a timer in the embodiment of the present disclosure. In this case, the safety switch device 3 performs processing for detecting whether the switch unit 31 has been operated with a predetermined timer period. When the switch unit 31 has been operated, since a stop instruction signal is output from the switch unit 31, the packet generation unit 32 in the safety switch device 3 converts the stop instruction signal into a packet and outputs the packet to the operation terminal 1, which further transfers the packet received from the safety switch device 3 to the controller 2. The controller 2 restores a stop instruction signal from the packet received from the operation terminal 1 and stops the machine 4 based on the restored stop instruction signal. It takes a certain time, after the controller 2 receives a packet from the operation terminal 1, until it receives the next packet, and when this time exceeds a preset time limit (set to a time shorter than the timer period) as well, the controller 2 stops the machine 4 for the sake of safety (alarm stop). When the safety switch device 3 is equipped with a timer, since active packet transmission to the operation terminal 1 may be preferably performed, a communication scheme which allows such communication may be preferably employed. For example, while wireless LANs such as Wi-Fi capable of mutual communication between devices or the like may be employed, USB cable communication using a fixed master-slave relationship may not be employed.

Figure 6:
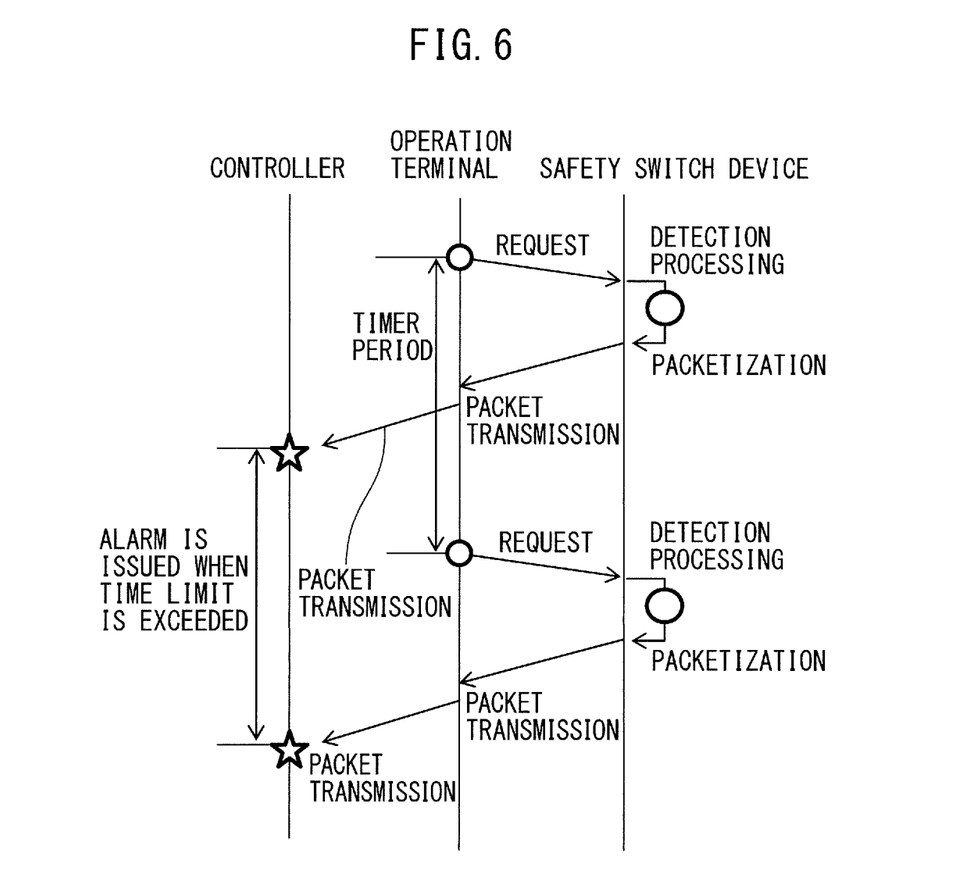
FIG. 6 is a diagram illustrating an exemplary communication diagram when the operation terminal is equipped with a timer in the embodiment of the present disclosure.

FIG. 6 is a diagram illustrating an exemplary communication diagram when the operation terminal is equipped with a timer in the embodiment of the present disclosure. In this case, the operation terminal 1 transmits a request signal to the safety switch device 3 with a predetermined timer period. In response to the request signal, the safety switch device 3 performs processing for detecting whether the switch unit 31 has been operated. When the switch unit 31 has been operated, since a stop instruction signal is output from the switch unit 31, the packet generation unit 32 in the safety switch device 3 converts the stop instruction signal into a packet and outputs the packet to the operation terminal 1, which further transfers the packet received from the safety switch device 3 to the controller 2. The controller 2 restores a stop instruction signal from the packet received from the operation terminal 1 and stops the machine 4 based on the restored stop instruction signal. It takes a certain time, after the controller 2 receives a packet from the operation terminal 1, until it receives the next packet, and when this time exceeds a preset time limit (set to a time shorter than the timer period) as well, the controller 2 stops the machine 4 for the sake of safety (alarm stop).

In one aspect of the present disclosure, a safety switch device, an operation terminal, and a machine control system including the same which can reliably stop a machine operating based on machine operation information in an emergency and achieve high convenience and versatility and low cost can be realized.

In another aspect of the present disclosure, in place of a dedicated teaching pendant, a teaching pendant including a mechanical safety switch unit such as an emergency stop button and an enable switch can be formed on a portable operation terminal (smart device) such as a tablet or a smartphone, so that the machine can be reliably stopped in an emergency and safety is high while achieving cost reduction and ensuring versatility and operator convenience. In still another aspect of the present disclosure, since a packet associated with a stop instruction signal is transmitted from the operation terminal to a controller for the machine using a communication channel common to the machine operation information, the cost is low. In still another aspect of the present disclosure, since a packet is transmitted from the safety switch device to the operation terminal via a communication channel different from that used to transmit the machine operation information and the packet to the controller, no signals interfere with each other. In still another aspect of the present disclosure, since packet generation processing associated with a stop instruction signal is dualized, the possibility that the controller will receive an erroneous stop instruction signal can be reduced even when a bug occurs within the operation terminal or communication failure occurs in each communication path, and safety is high.

What is claimed is:
1. A machine control system comprising:
  a portable operation terminal including a communication unit which communicates with a peripheral device and a touch panel unit used for display and input, the operation terminal outputting machine operation information for operating a machine via the communication unit based on an input operation to the touch panel unit;
  a controller which controls operation of the machine based on the machine operation information received from the operation terminal; and
  a safety switch device which is removably mounted on the operation terminal and includes a switch unit which outputs a stop instruction signal for issuing an instruction to stop the machine by being operated, and a packet generation unit which converts the stop instruction signal output by operating the switch unit into a packet and outputs the packet to the communication unit of the operation terminal,
  wherein the operation terminal transfers the packet received from the safety switch device to the controller via the communication unit, and
  the controller restores a stop instruction signal from the packet received from the operation terminal and stops the machine based on the restored stop instruction signal.

2. The machine control system according to claim 1, wherein the packet generation unit in the safety switch device converts the stop instruction signal into a multiplexed packet.

3. The machine control system according to claim 1, wherein the communication unit of the operation terminal transmits the packet to the controller via a communication channel common to the machine operation information.

4. The machine control system according to claim 3, wherein the communication unit of the operation terminal receives the packet from the safety switch device via a communication channel different from the communication channel used to transmit the machine operation information and the packet to the controller.

5. The machine control system according to claim 1, wherein the switch unit includes at least one of an emergency stop button which outputs the stop instruction signal by being pressed, and an enable switch which outputs the stop instruction signal by cancelling pressing.

6. A safety switch device for stopping a machine operating based on machine operation information received from a portable operation terminal including a communication unit which communicates with a peripheral device and a touch panel unit used for display and input, the device comprising:
a mount unit configured to removably mount the safety switch device on the operation terminal;
a switch unit which outputs a stop instruction signal for issuing an instruction to stop the machine by being operated; and
a packet generation unit which converts the stop instruction signal output by operating the switch unit into a packet and outputs the packet to the communication unit of the operation terminal,
wherein the machine is stopped by a controller which controls operation of the machine, based on a stop instruction signal restored from the packet transferred to the controller via the communication unit of the operation terminal.

7. The safety switch device according to claim 6, wherein the packet generation unit converts the stop instruction signal into a multiplexed packet.

8. The safety switch device according to claim 6, wherein the packet is transmitted to the controller, together with the machine operation information, via a common communication channel by the communication unit of the operation terminal.

9. The safety switch device according to claim 8, wherein the packet generation unit transmits the packet to the operation terminal via a communication channel different from the communication channel used to transmit the machine operation information and the packet to the controller by the communication unit of the operation terminal.

10. The safety switch device according to claim 6, wherein the switch unit includes at least one of an emergency stop button which outputs the stop instruction signal by being pressed, and an enable switch which outputs the stop instruction signal by cancelling pressing.

11. A portable operation terminal which transmits based on an input operation, machine operation information for operating a machine to a controller which controls operation of the machine, the terminal comprising:
a communication unit which communicates with a peripheral device including the controller;
a touch panel unit used for display and input operations in an editing task for the machine operation information; and
a housing on which a safety switch device including a switch unit which outputs a stop instruction signal for issuing an instruction to stop the machine by being operated, and a packet generation unit which converts the stop instruction signal output by operating the switch unit into a packet and outputs the packet to the communication unit of the operation terminal is removably mounted,
wherein the communication unit transfers the packet received from the packet generation unit in the safety switch device to the controller, and
the machine is stopped based on a stop instruction signal restored from the packet by the controller.

12. The operation terminal according to claim 11, wherein the stop instruction signal is converted into a multiplexed packet by the packet generation unit.

13. The operation terminal according to claim 11, wherein the communication unit transmits the packet to the controller via a communication channel common to the machine operation information.

14. The operation terminal according to claim 13, wherein the communication unit receives the packet from the safety switch device via a communication channel different from the communication channel used to transmit the machine operation information and the packet to the controller.

15. The operation terminal according to claim 11, wherein the switch unit includes at least one of an emergency stop button which outputs the stop instruction signal by being pressed, and an enable switch which outputs the stop instruction signal by cancelling pressing.

* * * * *